US012104703B2

United States Patent
Nicola et al.

(10) Patent No.: US 12,104,703 B2
(45) Date of Patent: Oct. 1, 2024

(54) FLUID MANAGEMENT SYSTEM

(71) Applicant: Leggett & Platt Canada Co., Halifax (CA)

(72) Inventors: Stefano Nicola, Windsor (CA); Daniel Schmitz, Altdorf (DE); Maxime Samain, Harelbeke (BE)

(73) Assignee: Leggett & Platt Canada Co., Halifax (CA)

( * ) Notice: Subject to any disclaimer, the term of this patent is extended or adjusted under 35 U.S.C. 154(b) by 0 days.

(21) Appl. No.: 17/622,143

(22) PCT Filed: Jun. 26, 2020

(86) PCT No.: PCT/CA2020/000079
§ 371 (c)(1),
(2) Date: Dec. 22, 2021

(87) PCT Pub. No.: WO2020/257914
PCT Pub. Date: Dec. 30, 2020

(65) Prior Publication Data
US 2022/0243827 A1    Aug. 4, 2022

Related U.S. Application Data

(60) Provisional application No. 62/868,197, filed on Jun. 28, 2019.

(51) Int. Cl.
*F16K 11/044* (2006.01)
*F16K 31/02* (2006.01)

(52) U.S. Cl.
CPC .......... *F16K 11/044* (2013.01); *F16K 31/025* (2013.01); *Y10T 137/86622* (2015.04)

(58) Field of Classification Search
CPC .... F15B 13/044; F15B 11/044; F15B 31/025; Y10T 137/86622; Y10T 137/86694; Y10T 137/86879

(Continued)

(56) References Cited

U.S. PATENT DOCUMENTS 3,203,447 A    8/1965   Bremner et al.
3,442,483 A    5/1969   Schwartz
(Continued)

FOREIGN PATENT DOCUMENTS

CA    2435356 A1    1/2001
CN    1277661 A    12/2000
(Continued)

OTHER PUBLICATIONS

G.Rau Innovative Metalle, "Thermal Actuators", 12 pages, retrieved Apr. 7, 2019.
(Continued)

*Primary Examiner* — Robert K Arundale
(74) *Attorney, Agent, or Firm* — Michael Best & Friedrich LLP

(57) ABSTRACT

A fluid management system includes a housing with a first port, a second port, and a third port, and a valve body moveable within the housing between a first position and a second position. The valve body is configured to seal the third port and permit fluid flow between the first and second ports in the first position, and to seal the first port and permit fluid flow between the second and third ports in the second position. The system further includes an actuator coupled to the valve body. The actuator includes a shape memory alloy material. A biasing element is coupled to the valve body to bias the valve body toward one of the first or second positions. The actuator is configured to move the valve body to one of the first or second positions against a biasing force of the biasing element in response to heating the actuator.

16 Claims, 9 Drawing Sheets

(58) Field of Classification Search
USPC .................................................. 251/129.06
See application file for complete search history.

(56) References Cited

U.S. PATENT DOCUMENTS

| | | | |
|---|---|---|---|
| 4,529,214 A | 7/1985 | Stoll et al. | |
| 4,548,041 A | 10/1985 | Taylor | |
| 4,630,799 A | 12/1986 | Nolan et al. | |
| 4,674,398 A | 6/1987 | Taylor | |
| 4,736,587 A * | 4/1988 | Suzuki | F16K 11/0655 |
| | | | 137/625.48 |
| 4,903,732 A * | 2/1990 | Allen | F16K 31/005 |
| | | | 137/625.65 |
| 4,922,965 A | 5/1990 | Meister | |
| 4,973,024 A | 11/1990 | Homma | |
| 5,148,833 A * | 9/1992 | Ota | F16K 31/008 |
| | | | 137/625.65 |
| 5,211,371 A | 5/1993 | Coffee | |
| 5,904,712 A | 5/1999 | Axelgaard | |
| 6,098,000 A | 8/2000 | Long et al. | |
| 6,203,105 B1 | 3/2001 | Rhodes, Jr. | |
| 6,499,509 B2 | 12/2002 | Berger et al. | |
| 7,744,059 B2 | 6/2010 | Jerg | |
| 7,815,161 B2 | 10/2010 | Saitoh et al. | |
| 8,499,779 B2 | 8/2013 | Gillespie | |
| 8,629,745 B2 | 1/2014 | Sturman et al. | |
| 8,784,080 B2 | 7/2014 | Dorfler et al. | |
| 8,794,707 B2 | 8/2014 | Bocsanyi et al. | |
| 9,080,581 B2 | 7/2015 | Bocsanyi et al. | |
| 9,186,853 B2 | 11/2015 | Khan et al. | |
| 9,797,521 B1 | 10/2017 | Davis | |
| 9,945,490 B2 | 4/2018 | Dankbaar et al. | |
| 9,951,765 B2 | 4/2018 | Ki et al. | |
| 10,066,756 B2 | 9/2018 | Sohn | |
| 10,107,279 B2 | 10/2018 | Dankbaar et al. | |
| 10,107,410 B2 | 10/2018 | Dankbaar et al. | |
| 10,207,619 B2 | 2/2019 | Dankbaar et al. | |
| 10,290,876 B2 | 5/2019 | Prieto et al. | |
| 10,378,677 B2 | 8/2019 | Kuszneruk et al. | |
| 10,753,494 B2 | 8/2020 | Beuschel et al. | |
| 10,948,097 B2 | 5/2021 | Dorfler et al. | |
| 11,073,219 B2 | 7/2021 | Dorfler et al. | |
| 2002/0112788 A1 | 8/2002 | Tanaka et al. | |
| 2003/0178074 A1* | 9/2003 | Itzhaky | F16K 31/006 |
| | | | 137/625.65 |
| 2003/0183289 A1 | 10/2003 | Seuret et al. | |
| 2005/0005980 A1 | 1/2005 | Eberhardt et al. | |
| 2005/0024174 A1 | 2/2005 | Kolb et al. | |
| 2005/0139610 A1 | 6/2005 | Crossdale et al. | |
| 2005/0139796 A1 | 6/2005 | Altonji | |
| 2005/0263196 A1 | 12/2005 | Hsieh | |
| 2007/0023089 A1 | 2/2007 | Beyerlein et al. | |
| 2007/0113906 A1 | 5/2007 | Sturman et al. | |
| 2008/0271559 A1 | 11/2008 | Garscha et al. | |
| 2010/0139785 A1 | 6/2010 | Saitoh et al. | |
| 2011/0095216 A1 | 4/2011 | Degreef et al. | |
| 2012/0067430 A1 | 3/2012 | Deperraz et al. | |
| 2012/0143108 A1 | 6/2012 | Bocsanyi et al. | |
| 2012/0153043 A1 | 6/2012 | Arekar et al. | |
| 2012/0199763 A1 | 8/2012 | Lind | |
| 2012/0199768 A1 | 8/2012 | Love et al. | |
| 2014/0103232 A1 | 4/2014 | Deperraz | |
| 2014/0191549 A1 | 7/2014 | Hermansson | |
| 2014/0232155 A1 | 8/2014 | Bocsanyi et al. | |
| 2015/0028234 A1 | 1/2015 | Kraus et al. | |
| 2016/0018016 A1 | 1/2016 | Dankbaar et al. | |
| 2016/0153575 A1 | 6/2016 | Sohn | |
| 2016/0207075 A1 | 7/2016 | Alexander et al. | |
| 2017/0025784 A1 | 1/2017 | Greene | |
| 2017/0097104 A1 | 4/2017 | Deperraz | |
| 2018/0023906 A1 | 1/2018 | Tajiri et al. | |
| 2018/0038514 A1 | 2/2018 | Kusneruk et al. | |
| 2018/0283571 A1 | 10/2018 | Miyazoe et al. | |
| 2018/0306212 A1 | 10/2018 | Weickel et al. | |
| 2018/0363642 A1 | 12/2018 | Salih et al. | |
| 2019/0003609 A1 | 1/2019 | Asai et al. | |
| 2019/0049026 A1 | 2/2019 | Beuschel et al. | |
| 2019/0049033 A1 | 2/2019 | Mitzler et al. | |
| 2019/0107214 A1 | 4/2019 | Kruppe et al. | |
| 2019/0116681 A1 | 4/2019 | De Carolis et al. | |
| 2019/0118690 A1 | 4/2019 | Beuschel et al. | |
| 2019/0120402 A1 | 4/2019 | Jamison et al. | |
| 2019/0195246 A1 | 6/2019 | Jamison et al. | |
| 2019/0353268 A1 | 11/2019 | Dorfler et al. | |
| 2019/0353270 A1 | 11/2019 | Dorfler et al. | |
| 2020/0088314 A1 | 3/2020 | Samain et al. | |
| 2020/0103047 A1 | 4/2020 | Beuschel et al. | |
| 2020/0287322 A1 | 9/2020 | Dörfler et al. | |
| 2020/0347833 A1 | 11/2020 | Dankbaar et al. | |
| 2020/0378516 A1 | 12/2020 | Beuschel et al. | |
| 2021/0018109 A1 | 1/2021 | Beuschel et al. | |
| 2022/0205551 A1* | 6/2022 | Nicola | F16K 31/025 |

FOREIGN PATENT DOCUMENTS

| | | |
|---|---|---|
| CN | 2526615 Y | 12/2002 |
| CN | 101095000 A | 12/2007 |
| CN | 103991396 A | 8/2014 |
| CN | 105465090 A | 4/2016 |
| CN | 108953683 A | 12/2018 |
| CN | 109318770 A | 2/2019 |
| DE | 19545011 A1 | 4/1997 |
| DE | 19718169 A1 | 11/1998 |
| DE | 10063478 A1 | 7/2002 |
| DE | 102005060217 A1 | 7/2006 |
| DE | 102006053147 A1 | 5/2007 |
| DE | 102011100327 B3 | 8/2012 |
| DE | 102013208820 A1 | 11/2014 |
| DE | 202014006875 U1 | 12/2014 |
| DE | 102015201534 B3 | 4/2016 |
| DE | 102014225756 A1 | 6/2016 |
| DE | 102016225519 A1 | 6/2018 |
| DE | 102017204662 B3 | 7/2018 |
| DE | 102017107073 A1 | 10/2018 |
| DE | 102017217213 B3 | 3/2019 |
| DE | 102018200635 A1 | 7/2019 |
| EP | 0423045 A1 | 4/1991 |
| EP | 1619287 A1 | 1/2006 |
| EP | 1909008 A1 | 4/2008 |
| EP | 1988440 A1 | 11/2008 |
| EP | 2078891 A2 | 7/2009 |
| EP | 2740521 A1 | 6/2014 |
| EP | 2860401 A2 | 4/2015 |
| EP | 3343078 A1 | 7/2018 |
| GB | 830393 A | 3/1960 |
| GB | 830394 A | 3/1960 |
| GB | 971816 A | 10/1964 |
| JP | 4091035 B2 | 5/2008 |
| WO | 2004104462 A1 | 12/2004 |
| WO | 2012159689 A1 | 11/2012 |
| WO | 2014135909 A1 | 9/2014 |
| WO | 2015185132 A | 12/2015 |
| WO | 2018005528 A1 | 1/2018 |
| WO | 2018049526 A1 | 3/2018 |
| WO | 2018065217 A1 | 4/2018 |
| WO | 2019149498 A1 | 8/2019 |
| WO | 2019/218072 A1 | 11/2019 |

OTHER PUBLICATIONS

International Search Report and Written Opinion for Application No. PCT/CA2020/000079 dated Oct. 6, 2020 (8 pages).
International Preliminary Report on Patentability for Application No. PCT/CA2020/000079 dated Jan. 6, 2022 (6 pages).
European Patent Office Extended Search Report for Application No. 20830631.6, dated Jun. 30, 2023 (8 pages).

* cited by examiner

FLUID MANAGEMENT SYSTEM

CROSS-REFERENCE TO RELATED APPLICATIONS

The present application is a national phase of International Patent Application No. PCT/CA2020/000079, filed on Jun. 26, 2020, which claims priority to U.S. Provisional Patent Application No. 62/868,197, filed Jun. 28, 2019, the entire content of each of which is incorporated herein by reference.

BACKGROUND

The present disclosure relates to fluid management systems, and more particularly to fluid management systems that can be controlled through the use of shape memory alloy materials.

In many industries including but not limited to comfort, aerospace, automotive, and furniture, there is a need for efficient ways to route air and other fluids for a variety of applications. Current solutions (e.g., valves) are often heavy, bulky and heavily customized for each specific application.

SUMMARY

The present disclosure provides a fluid management system that may be modular in nature and that may include one or more shape memory alloys or shape memory alloy elements.

For example, the present disclosure provides, in one aspect, a fluid management system including a housing with a first port, a second port, and a third port, and a valve body moveable within the housing between a first position and a second position. The valve body is configured to seal the third port and permit fluid flow between the first port and the second port in the first position, and to seal the first port and permit fluid flow between the second port and the third port in the second position. The system further includes an actuator coupled to the valve body. The actuator includes a shape memory alloy material. A biasing element is coupled to the valve body, and the biasing element is configured to bias the valve body toward one of the first position or the second position. The actuator is configured to move the valve body to one of the first position or the second position against a biasing force of the biasing element in response to heating the actuator.

The present disclosure provides, in another aspect, a fluid management system including a housing with a first portion having a first port and a second portion having a second port opposite the first port, a valve body moveable within the housing between a first position and a second position, the valve body configured to seal the first port and permit fluid flow through the second port in the first position and to seal the second port and permit fluid flow through the first port in the second position, an actuator coupled to the valve body, the actuator including a shape memory alloy material, a biasing element coupled to the valve body, the biasing element configured to bias the valve body toward one of the first position or the second position, and a power source electrically coupled to the actuator. The power source is configured to selectively drive current through the actuator to heat the actuator. The actuator is configured to move the valve body to one of the first position or the second position against a biasing force of the biasing element in response to heating the actuator, and the actuator and the biasing element are integrally formed together from a single piece of monolithic material.

The present disclosure provides, in another aspect, a fluid management system including a housing with a first port and a second port, a first valve body moveable within the housing between a first position and a second position, the first valve body configured to seal the first port in the first position and to permit fluid flow through the first port in the second position, a second valve body movable within the housing between a first position and a second position, the second valve body configured to seal the second port in the first position and to permit fluid flow through the second port in the second position, a first actuator coupled to the first valve body, and a second actuator coupled to the second valve body. The first actuator is configured to move the first valve body to one of the first position or the second position in response to heating the first actuator, and the second actuator is configured to move the second valve body to one of the first position or the second position in response to heating the second actuator.

Other features and aspects of the disclosure will become apparent by consideration of the following detailed description and accompanying drawings.

Before any embodiments of the disclosure are explained in detail, it is to be understood that the disclosure is not limited in its application to the details of construction, geometry, and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
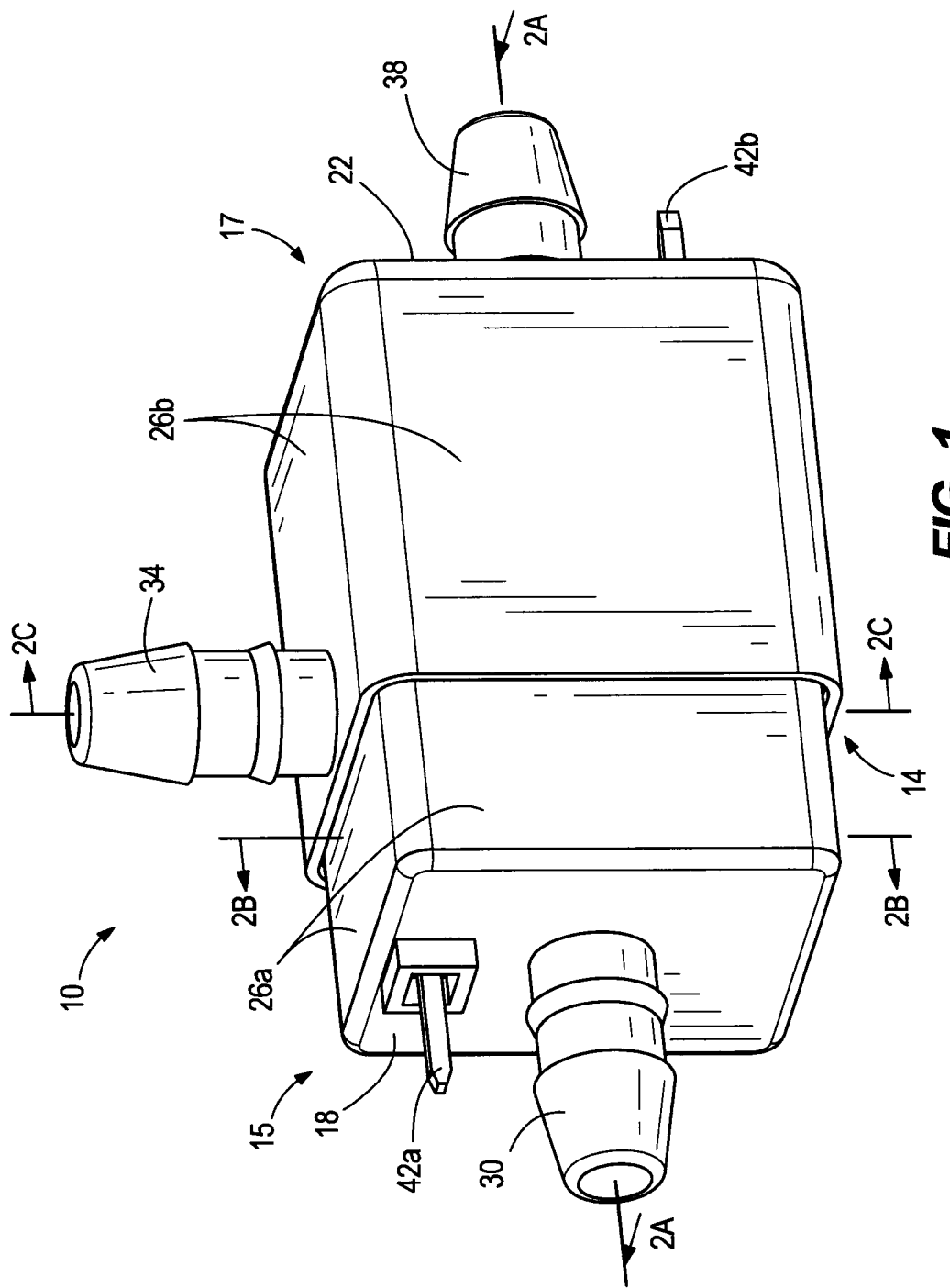
FIG. 1 is a perspective view of a fluid management system in accordance with an embodiment of the disclosure.
Figure 2A:
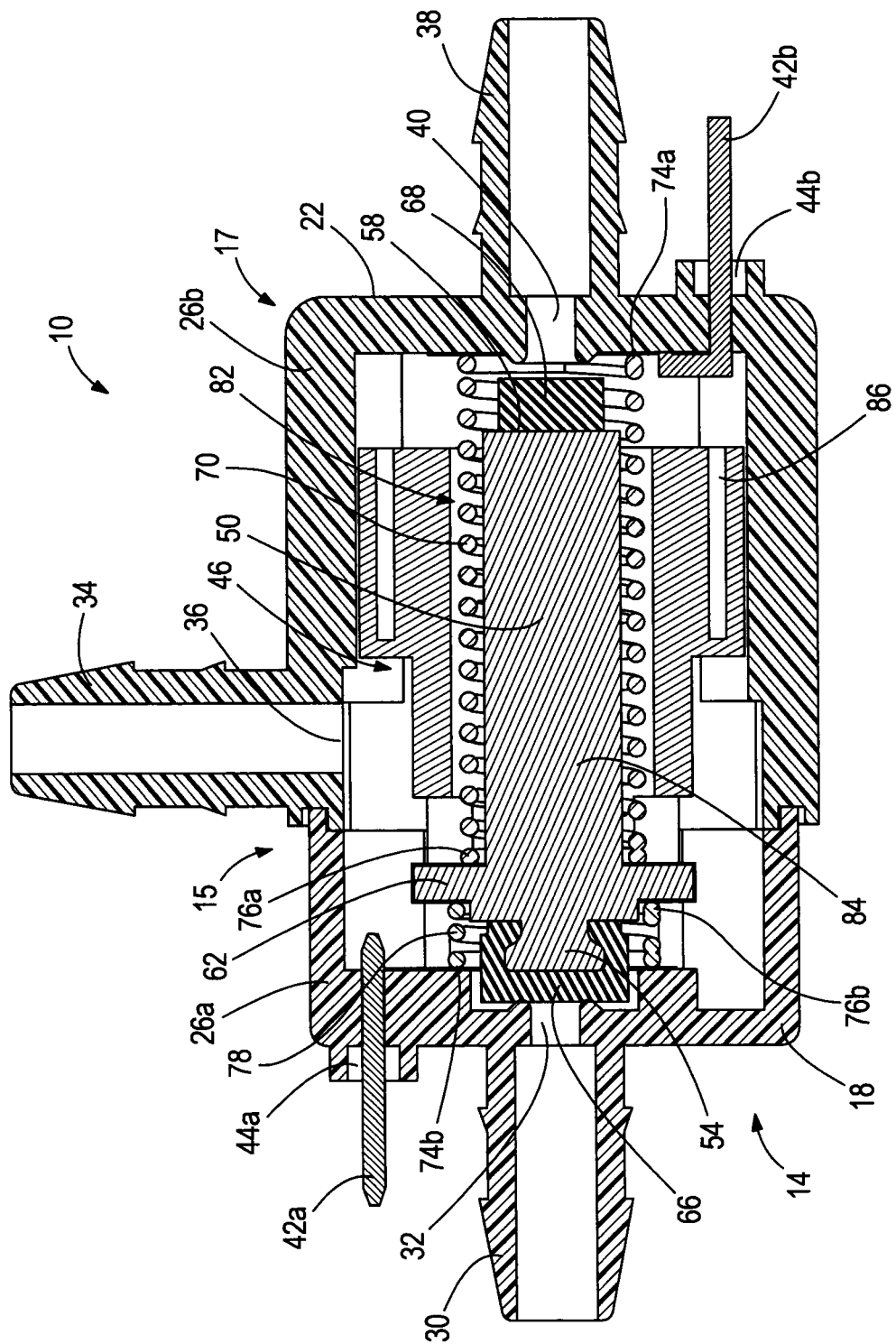
FIG. 2A is a cross-sectional view of the fluid management system of FIG. 1, taken along line 2A.
Figure 2C:
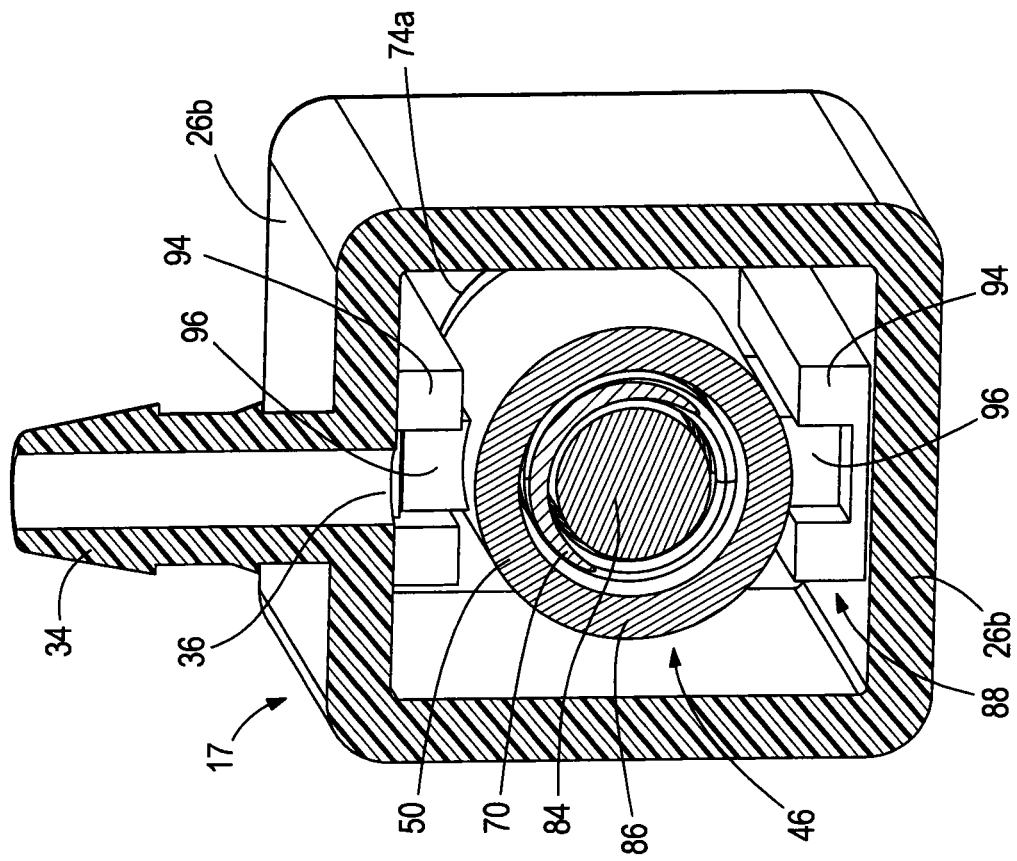
FIG. 2C is a cross-sectional view of the fluid management system of FIG. 1, taken along line 2C.

FIGS. 1-2C illustrate a fluid management system 10 according to an embodiment of the present disclosure. The system 10 includes a housing 14 with a first portion 15 and a second portion 17 coupled to the first portion 15 in a substantially air-tight manner. The first portion 15 has a first end wall 18 and a plurality of side walls 26a extending from the first end wall 18. The second portion 17 has a second end wall 22 opposite the first end wall 18 and a plurality of side walls 26b extending from the second end wall 22.

The housing 14 in the illustrated embodiment is substantially rigid and may be made of one or more plastic materials (e.g., polyethylene, polypropylene, ABS, or the like) via a molding process or any other suitable process. In some embodiments, the first portion 15 and/or the second portion 17 may be interchangeable with other housing components to provide the housing 14 with different sizes, shapes, or other configurations. For example, in some embodiments, one or more mounting features (e.g., hooks, bosses, bores, tabs, clips, or the like) may be provided on one or both of the portions 15, 17. One or both of the portions 15, 17 may be interchanged with other housing portions having different mounting features to provide the housing 14 with a desirable configuration for a particular application.

Referring to FIG. 2A, the illustrated system 10 includes a first port or pressure port 30 that communicates with an interior of the housing 14 via a pressure port opening 32, a second port or bladder port 34 that communicates with the interior of the housing 14 via a bladder port opening 36, and a third port or vent port 38 that communicates with the interior of the housing 14 via a vent port opening 40. In addition, a pair of electrodes 42a, 42b extends from the housing 14 through electrode openings 44a, 44b. In the illustrated embodiment, the pressure port 30 is integrally formed (e.g., molded) as a part of the first portion 15 of the housing 14, and the bladder port 34 and vent port 38 are integrally formed as a part of the second portion 17 of the housing 14. The housing portions 15, 17 may be molded around the respective electrodes 42a, 42b, which in some embodiments, may form a substantially fluid-tight seal between the electrodes 42a, 42b and the respective electrode openings 44a, 44b. In other embodiments, the electrodes 42a, 42b may be inserted through the openings 44a, 44b after the housing 14 is formed.

With reference to FIGS. 1-2A, in the illustrated embodiment, the pressure port 30 and the electrode 42a extend from the first end wall 18, the vent port 38 and the electrode 42b extend from the second end wall 22, and the bladder port 34 extends from one of the side walls 26b. As such, the pressure port 30 and the vent port 38, as well as the respective electrodes 42a, 42b, extend from the housing 14 in opposite directions. The bladder port 34 extends from the housing 14 generally transverse to the pressure and vent ports 30, 38. The illustrated construction may advantageously provide greater access to each of the ports 30, 34, 38 and electrodes 42a, 42b to facilitate making connections with fluid lines and electrical lines while minimizing the overall size of the housing 14. In other embodiments, the relative positions of the ports 30, 34, 38 and/or the electrodes 42a, 42b may vary.

In the illustrated embodiment, the pressure port 30, the bladder port 34, and the vent port 38 include barb fittings; however the ports 30, 34, 38 may include any other type of fittings (e.g., banjo fittings, threaded fittings, etc.) to suit a particular application. The pressure port 30 may be coupled to a source of pressurized fluid (e.g., air), the bladder port 34 may be coupled to a vessel for containing the pressurized air (e.g., an inflatable bladder; not shown) or to a downstream valve assembly or fluidic switching module configured to route the pressurized air to one or more such vessels, and the vent port 38 may be coupled to a location having lower or ambient pressure, such as an exhaust manifold. Alternatively, the vent port 38 may be in direct fluid communication with the environment surrounding the system 10. In other embodiments, the ports could be configured differently (e.g., the first port 30 could be the vent port, and the third port 38 could be the pressure port, etc.).

Referring to FIG. 2A, an actuator assembly 46 is contained within the housing 14. The actuator assembly 46 includes a valve body or piston 50 with a first end 54, a second end 58, and an annular flange 62. A pressure port seal element 66 is coupled to the first end 54 of the piston 50 and a vent port seal element 68 is coupled to the second end 58 of the piston 50. In the illustrated embodiment, a first spring 70 extends between and is electrically coupled to a conductive plate 74a disposed on the inner surface of the second end wall 22 and a conductive plating 76a disposed on the annular flange 62. An actuator in the form of a second spring 78 extends between and is electrically coupled to a conductive plate 74b disposed on the inner surface of the first end wall 18 and a conductive plating 76b disposed on the annular flange 62.

In the illustrated embodiment, the first spring 70 is a coil compression spring made of an electrically-conductive metal (e.g., spring steel), and the second spring 78 is a coil spring made of a shape memory alloy material. The shape memory alloy material has temperature-dependent shape memory based on a fully reversible martensite to austenite transformation. That is, the shape memory alloy material has one shape or dimension associated with a martensitic crystalline structure at low temperature and another shape or dimension associated with an austenitic crystalline structure at high temperature. The transformation is reversible, such that the shape and/or size of the second spring 78 can be selectively varied.

In the illustrated embodiment, the second spring 78 is made of a binary Nickel-Titanium alloy. Alternatively, a Nickel-Titanium alloy system with one or more other elements, such as chromium, cobalt, copper, iron, hafnium, niobium, or others may be used. In yet other embodiments, the second spring 78 may be made from any other alloy with temperature-dependent shape memory. In addition, the second spring 78 may be made from a monolithic piece of the shape memory alloy material, which may simplify manufacturing of the second spring 78 and reduce the cost of the fluid management system 10. The first spring 70 in the illustrated embodiment does not have a temperature-dependent shape memory, but the first spring 70 may additionally or alternatively be made of a shape memory alloy material in other embodiments. In some embodiments, the second spring 78 may be made of spring steel and the first spring 70 may be made of the shape memory alloy material.

With continued reference to FIG. 2A, the electrodes 42a, 42b extending from the housing 14 are electrically coupled to respective conductive plates 74a, 74b. The ends of the electrodes 42a, 42b extending from the housing 14 are configured to be electrically coupled to a power source (not shown) such that the power source, the electrodes 42a, 42b, the conductive plates 74a, 74b, the second spring 78, the conductive platings 76a, 76b, and the first spring 70, form an electric circuit 82.

The piston 50 is movable between a first or inflating position and a second or deflating position to selectively inflate or deflate the vessel coupled to the bladder port 34. In the deflating position, the pressure port seal element 66 engages and seals the pressure port opening 32, while the vent port seal element 68 is spaced from the vent port opening 40 to permit fluid flow through the vent port opening 40. As such, pressurized air is prevented from entering the interior of the housing 14 through the pressure port opening 32, and the interior of the housing 14 fluidly communicates with the ambient environment through the vent port opening 40. This allows the vessel coupled to the bladder port 34 to deflate. In the inflating position, the vent port seal element 68 engages and seals the vent port opening 40, while the pressure port seal element 66 is spaced from the pressure port opening 32 to permit fluid flow through the pressure port opening 32. As such, the interior of the housing 14 fluidly communicates with the source of pressurized air to pressurize the interior of the housing 14 and thereby inflate the vessel coupled to the bladder port 34.

Figure 2B:
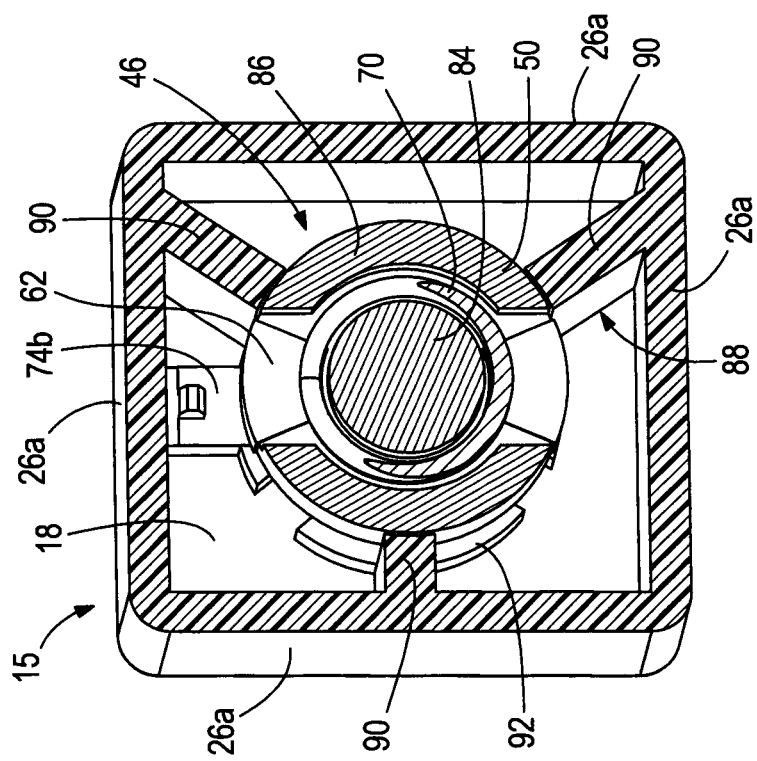
FIG. 2B is a cross-sectional view of the fluid management system of FIG. 1, taken along line 2B.

Referring to FIGS. 2A-C, in the illustrated embodiment, the piston 50 includes a core 84 and a collar 86 at least partially surrounding the core 84. The collar 86 and the core 84 may be integrally formed together as a single piece, joined together at the annular flange 62. The collar 86 extends along the core 84 to define an annular space between the collar 86 and the core 84 that receives the first spring 70. The collar 86 and the core 84 may thus act as spring guides for the first spring 70.

Referring to FIGS. 2B-2C, the housing 14 may include internal support features 88 that support the actuator assembly 46 and/or guide movement of the piston 50. For example, in the illustrated embodiment, the first portion 15 of the housing 14 includes a plurality of support walls 90 extending inwardly from the side walls 26a (FIG. 2B). The support walls 90 may be in sliding contact with the outside of the collar 86 and/or the flange 62 of the piston 50 to at least partially support and guide movement of the piston 50 as it moves between the first and second positions. In the illustrated embodiment, the first portion 15 of the housing 14 includes three support walls 90, each spaced about the circumference of the collar 86 and separated by about 120 degrees. The support walls 90 thus may provide three points of contact with the collar 86 and/or the flange 62. In other embodiments, a different number/arrangement of support walls 90 may be provided.

Referring to FIG. 2C, the second housing portion 17 includes pairs of internal guide rails 94 that define channels therebetween. Projections 96 on the piston 50, and more specifically on the collar 86 of the piston 50, are slidably received within the channels between the guide rails 94. The engagement between the guide rails 94 and the projections 96 may thus at least partially support and guide movement of the piston 50 as it moves between the first and second positions. The piston 50 includes two projections 96 in the illustrated embodiment; however, other numbers and arrangements of projections 96 and/or guide rails 94 may be provided.

In addition to supporting/guiding the piston 50, the internal support features 88 of the housing 14 may also support the conductive plates 74a, 74b. For example, the first housing portion 15 in the illustrated embodiment includes arcuate wall segments 92 extending inwardly from the first end wall 18. The wall segments 92 may both axially and radially support the conductive plate 74b to absorb the spring force exerted on the conductive plate 74b by the first and second springs 70, 78. Although not illustrated in FIG. 2C, the second housing portion 17 may include similar structures to support the conductive plate 74b.

The internal support features 88 may advantageously be integrally formed together with the respective housing portions 15, 17 (e.g., during molding of the housing portions 15, 17). The support features 88 may facilitate assembly of the fluid management system 10 by guiding insertion of the actuator assembly 46 into the housing 14 and ensuring proper placement of the actuator assembly 46 within the housing 14.

In some embodiments, the actuator assembly 46 may be installed into the second housing portion 17 during assembly, with the internal support features 88 guiding installation of the actuator assembly 46 into the second housing portion 17. Then, the first housing portion 15 may be moved toward and coupled to the second housing portion 17 to enclose the actuator assembly 46 within the housing 14. The internal support features 88 may facilitate aligning the first housing portion 15 with the actuator assembly 46. As the first housing portion 15 is moved toward the second housing portion 17, the springs 70, 78 may be compressed between the ends 18, 22 of the housing 14 to provide a desired pre-load.

In operation, to inflate the vessel, the pressurized air source supplies pressurized air to the pressurized air port 30 of the system 10, and the power source is energized. The power source drives current through the electric circuit 82, such that current flows from the power source through the second spring 78. As a result of the applied current, the second spring 78 is heated.

In the illustrated embodiment, the piston 50 is biased toward the deflating position. Specifically, the first spring 70 pushes against the annular flange 62 to hold the piston 50 in the deflating position so that the pressure port seal element 66 is held against the pressure port opening 32. When the second spring 78 is heated, the shape memory alloy material changes from a martensitic structure to an austenitic structure and expands in an axial direction. Because the second spring 78 is rigidly coupled to the first end wall 18, the second spring 78 expands away from the first end wall 18 and pushes the annular flange 62 toward the second end wall 22 against the biasing force of the first spring 70. The second spring 78 pushes the piston 50 with sufficient force to move the piston 50 to the inflating position, and pressurized air is allowed to enter the interior of the housing 14.

In the inflating position, the pressurized air entering the interior of the housing 14 is prevented from exiting the interior of the housing 14 through the vent port opening 40. Because the vent port opening 40 is sealed, pressure may build within the housing 14 to cause air to flow through the bladder port 34 and into the vessel, thereby inflating the vessel.

To return the piston 50 to the deflating position, the power source is deenergized to cease driving current through the electric circuit 82. Without current flowing through the second spring 78, the second spring 78 cools, and the shape memory alloy material changes back from an austenitic structure to a martensitic structure. The second spring 78 thus contracts, and the compressed spring 70 restores itself, expanding away from the second end wall 22 to push against the annular flange 62 and move the piston 50 to the deflating position. With the pressure port opening 32 sealed and the vent port opening 40 now open, the pressurized air contained in the vessel flows from the vessel through the interior of the housing 14 and exits through the vent port opening 40. Therefore, pressurized air contained in the vessel exits the vessel so that the vessel deflates.

Figure 3:
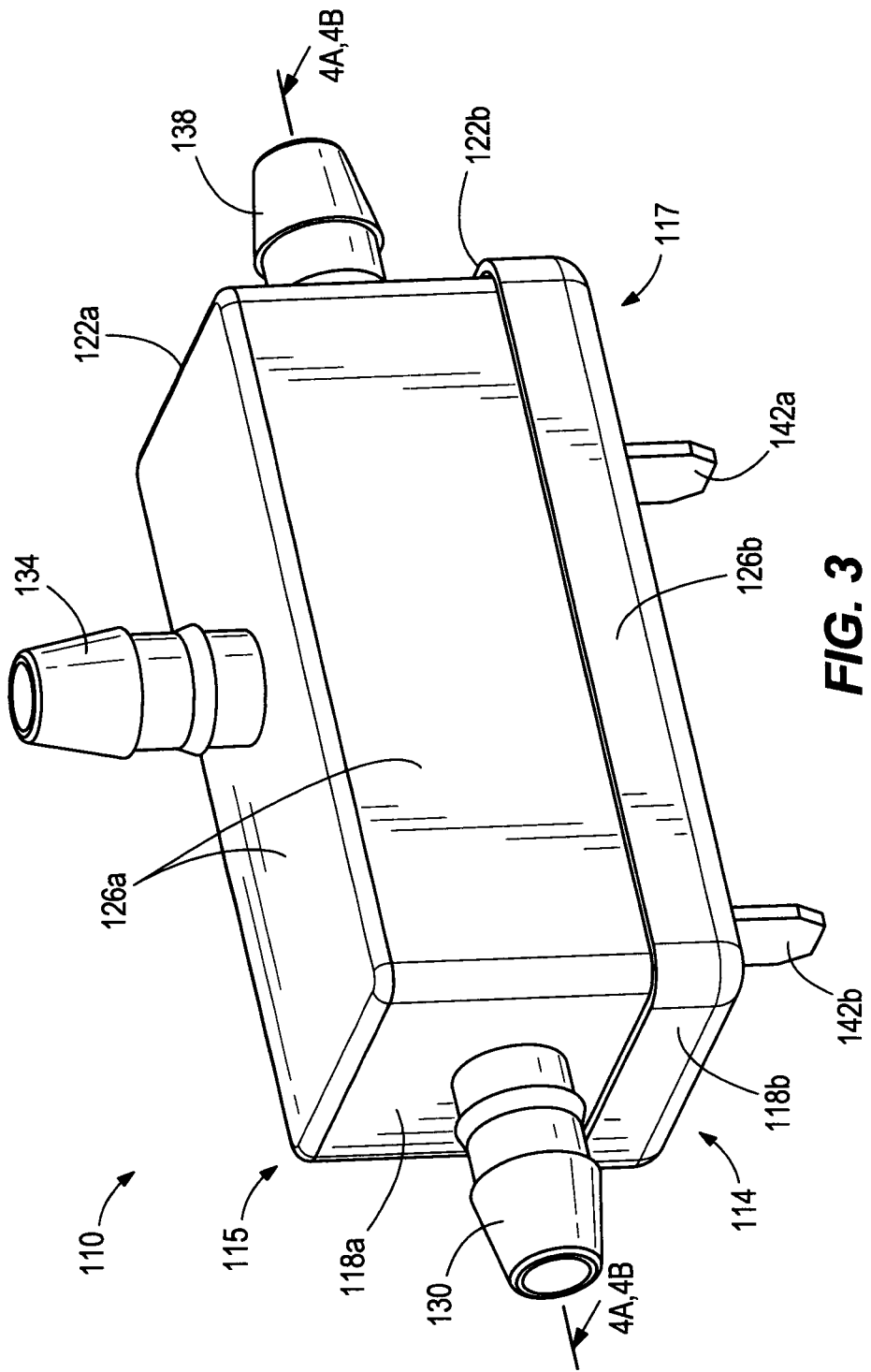
FIG. 3 is a perspective view of a fluid management system in accordance with another embodiment of the disclosure.
Figure 4A:
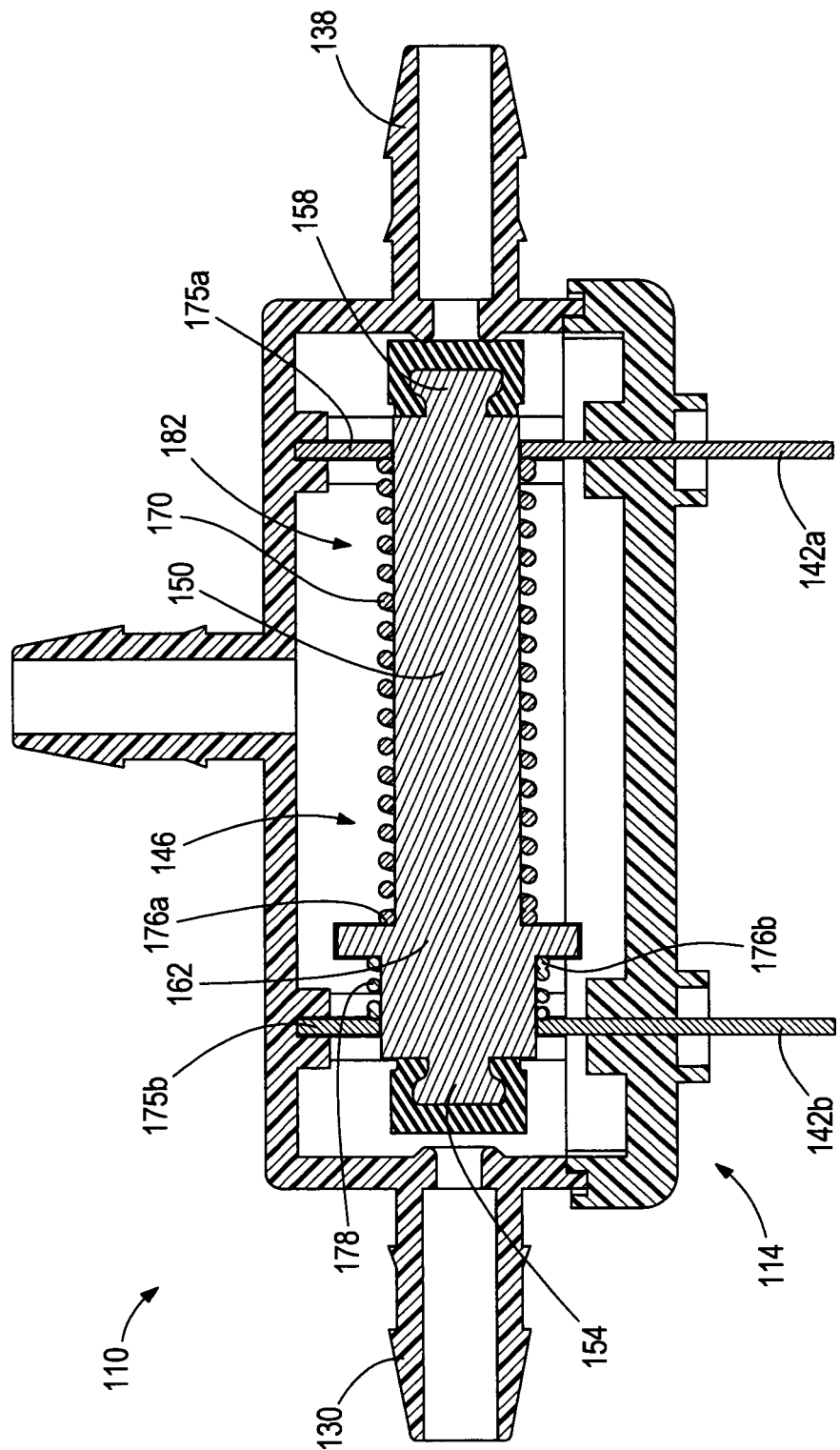
FIG. 4A is a cross-sectional view of the fluid management system of FIG. 3, taken along line 4A.
Figure 4B:
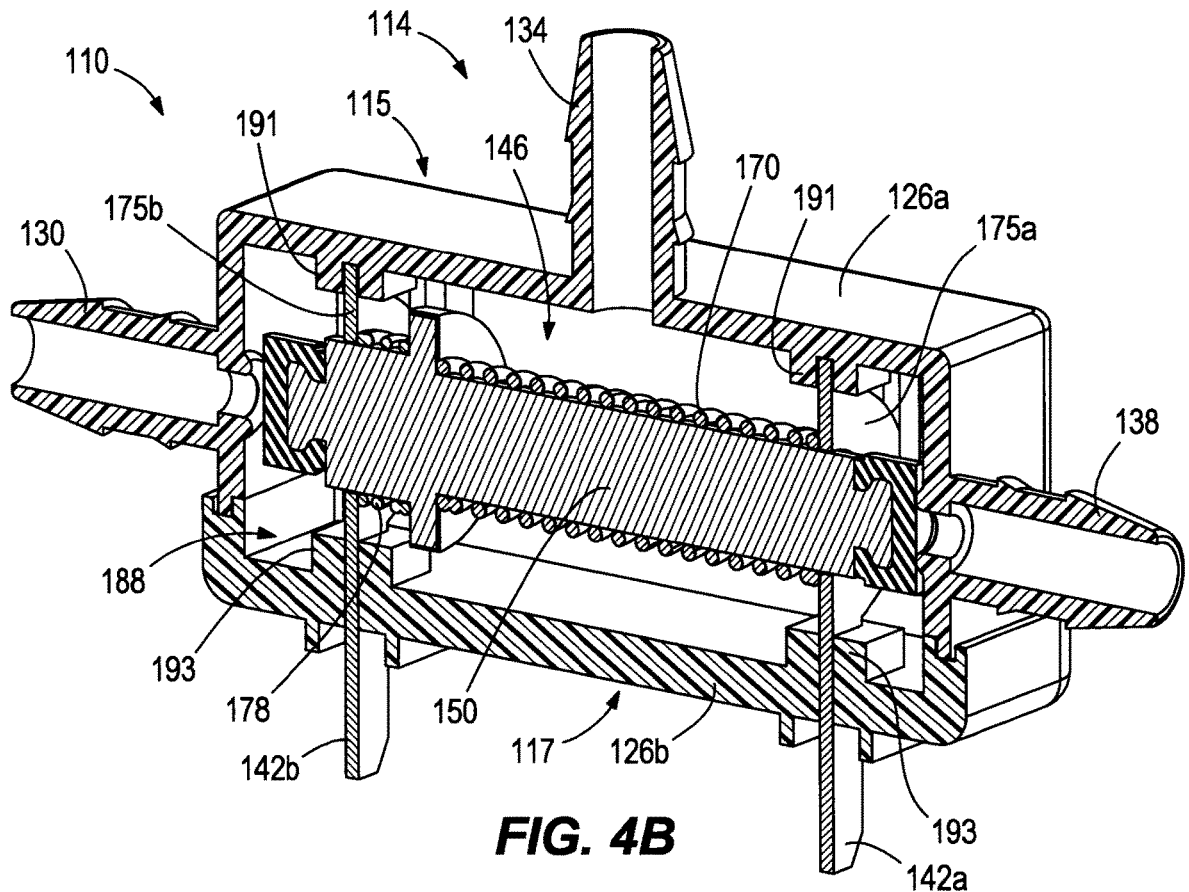
FIG. 4B is a cross-sectional view of the fluid management system of FIG. 3, taken along line 4B.

FIGS. 3-4B illustrate a fluid management system 110 according to another embodiment. The illustrated fluid management system 110 is similar to the system 10 described above with reference to FIGS. 1-2C. The features and elements of the system 110 corresponding with features and elements of the system 10 are given corresponding reference numbers plus '100.' In addition, the following description focuses primarily on differences between the system 110 and the system 10. It should be understood that features and elements of the system 10 may be incorporated into the system 110, and vice versa.

Referring to FIGS. 3 and 4A, the fluid management system 110 includes a housing 114 with a first portion 115 and a second portion 117 coupled to the first portion 115 in a substantially air-tight manner. The first portion 115 has a first end wall 118a, a second end wall 122a, and a plurality of side walls 126a extending between the first end wall 118a and the second end wall 122a, while the second portion 117 has a first end wall 118b, a second end wall 122b, and a plurality of side walls 126b extending between the first end wall 118b and the second end wall 122b. In this embodiment, a pressure port 130 extends from the first end wall 118a, a vent port 138 extends from the second end wall 122a, a bladder port 134 extends from one of the plurality of side walls 126a, and electrodes 142a, 142b extend from one of the plurality of side walls 126b. The electrodes 142a, 142b extend from the same side wall 126b opposite the bladder port 134 in the illustrated embodiment, which may facilitate placement of the fluid management system 110 in small spaces.

With reference to FIG. 4A, an actuator assembly 146 is contained within the housing 114. The actuator assembly 146 includes a valve body or piston 150 with a first end 154, a second end 158, and an annular flange 162. In this illustrated embodiment, a first spring 170 extends between and is electrically coupled to a conductive flange 175a arranged concentrically around the piston 150 and a conductive plating 176a disposed on the annular flange 162. An actuator in the form of a second spring 178 extends between and is electrically coupled to a conductive flange 175b arranged concentrically around the piston 150 and a conductive plating 176b disposed on the annular flange 162. In the illustrated embodiment, the conductive flanges 175a, 175b are spaced from the end walls 118a, 118b, 122a, 122b of the housing 114.

With continued reference to FIG. 4A, the electrodes 142a, 142b are electrically coupled to respective conductive flanges 175a, 175b, and in the illustrated embodiment, the electrodes 142a, 142b are integrally formed with the flanges 175a, 175b. The ends of the electrodes 142a, 142b extending from the housing 114 are configured to be electrically coupled to a power source such that the power source, the electrodes 142a, 142b, the conductive flanges 175a, 175b, the second spring 178, the conductive platings 176a, 176b, and the first spring 170 form an electric circuit 182.

Referring to FIG. 4B, the housing 114 may include internal support features 188 that support the actuator assembly 146 and/or guide movement of the piston 150. For example, in the illustrated embodiment, the first portion 115 of the housing 114 includes a plurality of support walls 191 extending inwardly from the side walls 126a, and the second portion 117 of the housing 114 includes a plurality of support walls 193 extending inwardly from the side walls 126b. The support walls 191, 193 are provided in pairs that define slots therebetween to receive portions of the conductive flanges 175a, 175b. As such, the walls 191, 193 may support the flanges 175a, 175b to absorb the forces of the springs 170, 178.

The internal support features 188 may advantageously be integrally formed together with the respective housing portions 115, 117 (e.g., during molding of the housing portions 115, 117). The support features 188 may facilitate assembly of the fluid management system 110 by guiding insertion of the flanges 175a, 175b and electrodes 142a, 142b into the housing 114 and thereby ensuring proper placement of the actuator assembly 146 within the housing 114 and proper pre-loading of the springs 170, 178.

Like the first spring 70 and second spring 78 described above with reference to FIGS. 1 and 2, the first spring 170 is a compression coil spring made of metal such as spring steel, and the second spring 178 is a coil spring made of shape memory alloy material. The fluid management system 110 illustrated in FIGS. 3-4B operates in much the same way as the fluid management system 10 described above with reference to FIGS. 1 and 2. The piston 150 is movable between a first or inflating position and a second or deflating position to selectively inflate or deflate a vessel coupled to the bladder port 134.

To inflate the vessel, the pressurized air source supplies pressurized air to the pressurized air port 130 of the system 110, and the power source is energized. The power source drives current through the electric circuit 182, such that current flows from the power source through the second spring 178. This heats the second spring 178, which then expands away from the conductive flange 175b and pushes against the annular flange 162 to move the piston 150 toward the second end walls 122a, 122b against the biasing force of the first spring 170. The second spring 178 pushes the piston 150 with sufficient force to move the piston 150 to the inflating position.

To deflate the vessel, the power source is deenergized to cease driving current through the electric circuit 182 such that current no longer flows from the power source through the second spring 178. Without current flowing through the second spring 178, the second spring 178 cools and contracts. The first spring 170 restores itself, expanding away from the conductive flange 175a to push against the annular flange 162 and move the piston 150 to the deflating position.

Figure 5:
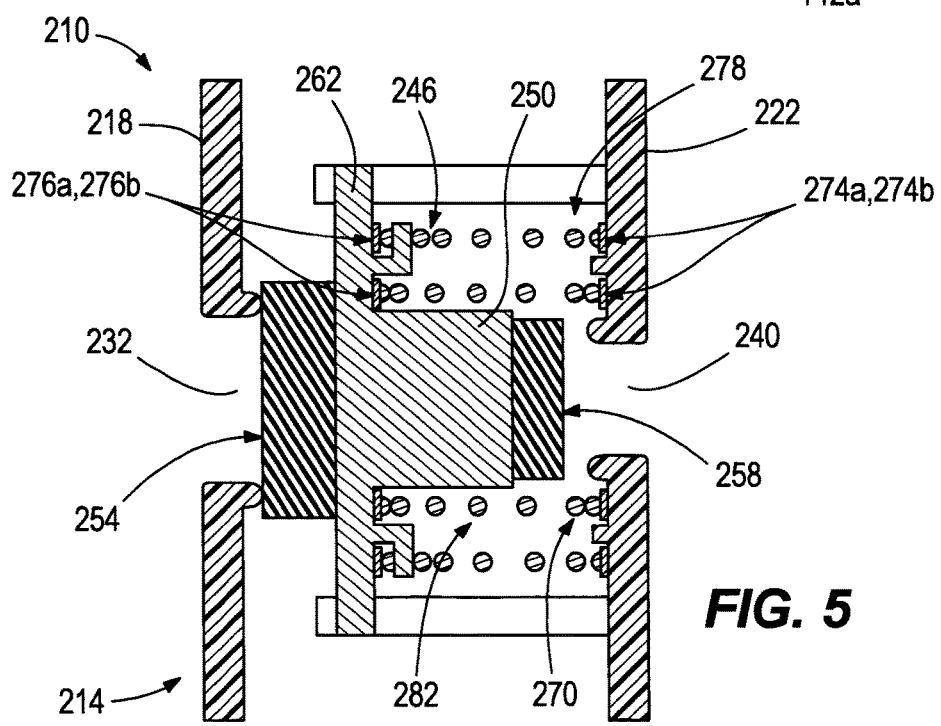
FIG. 5 is a cross-sectional view of a fluid management system in accordance with another embodiment of the disclosure.

FIG. 5 illustrates a fluid management system 210 according to another embodiment. The illustrated fluid management system 210 is similar to the fluid management system 10 described above with reference to FIGS. 1-2C. Features and elements of the system 210 corresponding with features and elements of the system 10 are given corresponding reference numbers plus '200.' In addition, the following description focuses primarily on differences between the system 210 and the system 10. It should be understood that features and elements of the system 10 may be incorporated into the system 210, and vice versa.

Referring to FIG. 5, the fluid management system 210 includes a housing 214. The housing 214 has a first end wall 218, a second end wall 222, and a plurality of side walls (not shown) extending between the first end wall 218 and the second end wall 222. In this embodiment, a pressure port opening 232 is disposed in the first end wall 218, a vent port opening 240 is disposed in the second end wall 222, and a bladder port opening (not shown) is disposed in one of the plurality of side walls.

With continued reference to FIG. 5, an actuator assembly 246 is contained within the housing 214. The actuator assembly 246 includes a valve body or piston 250 with a first end 254, a second end 258, and an annular flange 262. In the illustrated embodiment, a first spring 270 extends between and is electrically coupled to a conductive plate 274a disposed on the second end wall 222 of the housing 214 and a conductive plating 276a disposed on the annular flange 262. The first spring 270 is configured as a compression spring made of spring steel. An actuator in the form of a second spring 278 extends between and is electrically coupled to a conductive plate 274b disposed on the second end wall 222 of the housing 214 and a conductive plating 276b disposed on the annular flange 262. The second spring 278 is made of shape memory alloy material. The illustrated second spring 278 is arranged concentrically around the first spring 270. Alternatively, the second spring 278 may be arranged concentrically within the first spring 270. In some embodiments, the second spring 278 and the first spring 270 may not be concentrically arranged.

With continued reference to FIG. 5, the conductive plates 274a, 274b are in electrical communication with a power source such that the power source, the conductive plates 274a, 274b, the second spring 278, the conductive platings 276a, 276b, and the first spring 270 form an electric circuit 282. The fluid management system 210 illustrated in FIG. 5 operates in a similar manner as the fluid management system 10 described above with reference to FIGS. 1 and 2. That is, to inflate or deflate the vessel, the piston 250 is movable between an inflating position and a deflating position in response to selective energization of the power source.

To move the piston 250 into an inflating position, the power source is energized to drive current through the electric circuit 282 such that current flows from the power source through the second spring 278. This heats the second spring 278, which then contracts towards the second end wall 222 and pulls the annular flange 262 to move the piston 250 towards the second end wall 222 against the biasing force of the first spring 270. Pressurized air provided by the air source at the port opening 232 of the system 210 enters the housing 214 and exits through the bladder port opening to inflate the vessel.

To move the piston 250 into a deflating position, the power source is de-energized to cease driving current through the electric circuit 282. The second spring 278 cools and the first spring 270 restores itself, expanding away from the second end wall 222 to push the annular flange 262 and move the piston 250 into the deflating position. Pressurized air provided by the air source at the port opening 232 of the system 210 is prevented from entering the housing 214, and the pressurized air held in the vessel exits the vessel through the housing 214 and out the vent port opening 240 to deflate the vessel.

In alternative embodiments, the first spring 270 may be configured as a tension spring rather than a compression spring, and the second spring 278 may be configured to expand rather than contract when the power source drives current through the electric circuit 282.

Figure 7:
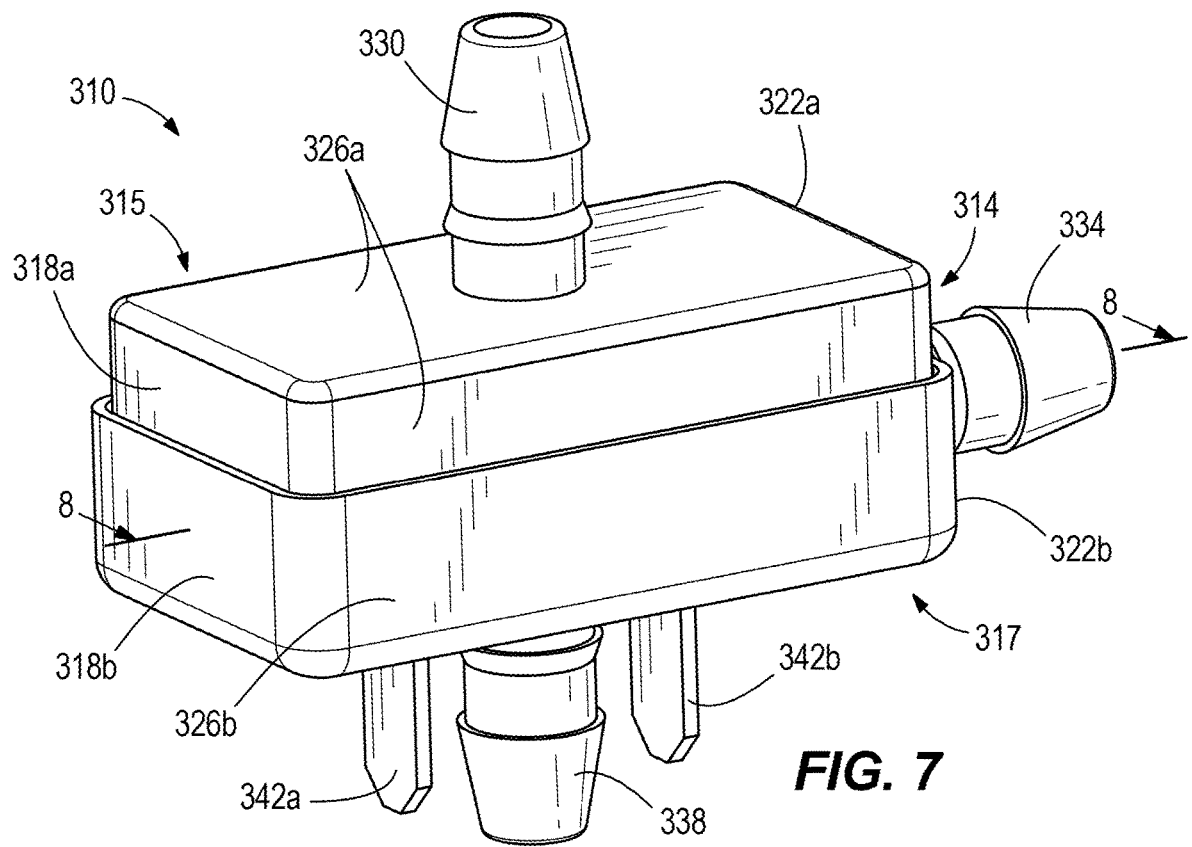
FIG. 7 is a perspective view of a fluid management system in accordance with another embodiment of the disclosure, incorporating the shape memory alloy actuator of FIG. 6.
Figure 8:
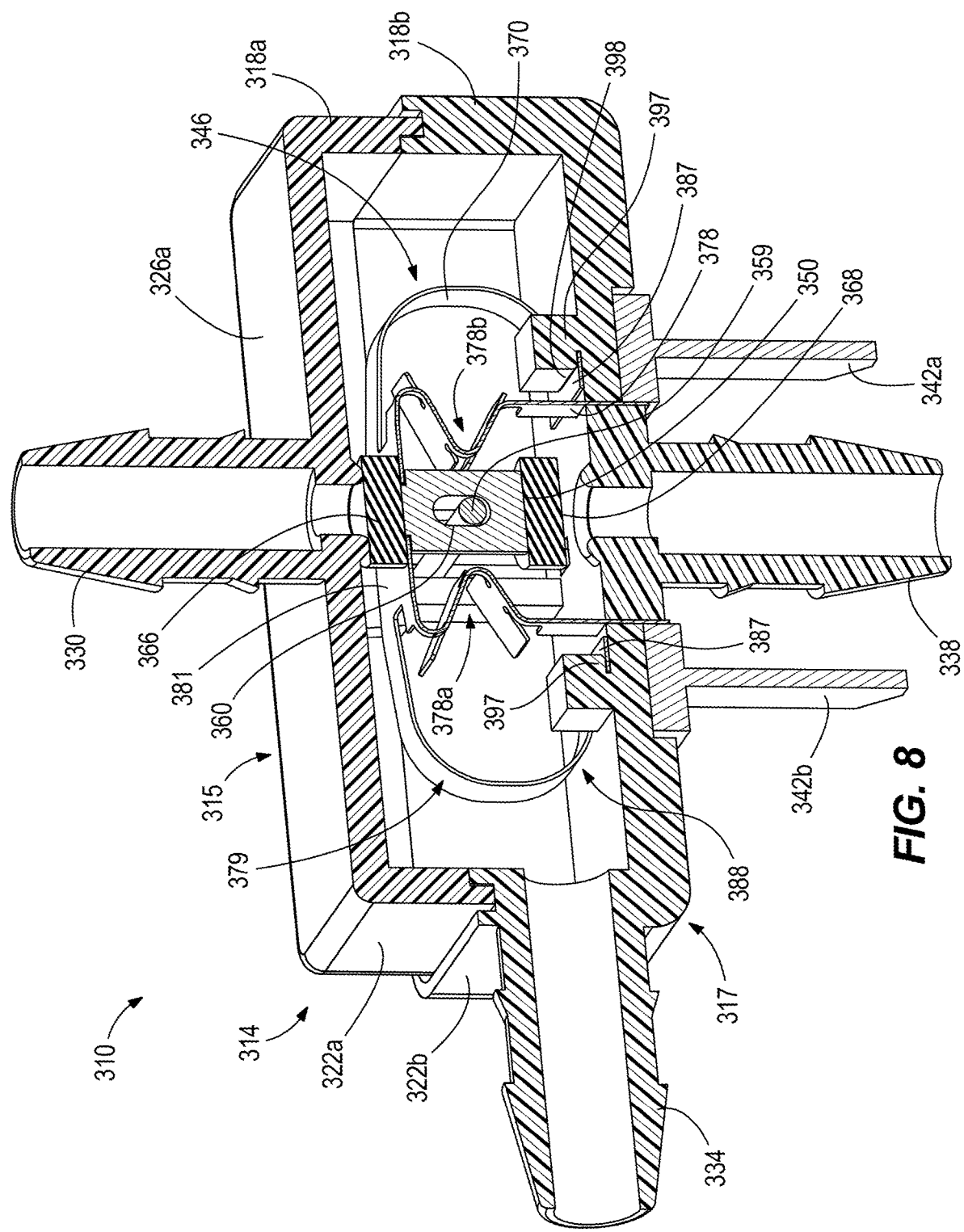
FIG. 8 is a cross-sectional view of the fluid management system of FIG. 7, taken along line 8.

FIGS. 7-8 illustrate a fluid management system 310 according to another embodiment. The illustrated fluid management system 310 is similar to the fluid management system 10 described with reference to FIGS. 1-2C. Features and elements of the system 310 corresponding with features and elements of the system 10 are given corresponding reference numbers plus '300.' In addition, the following description focuses primarily on differences between the system 310 and the system 10. It should be understood that features and elements of the system 10 may be incorporated into the system 310, and vice versa.

The fluid management system 310 includes a housing 314 having a first portion 315 and a second portion 317 coupled to the first portion 315 in a substantially air-tight manner. The first portion 315 has a first end wall 318a, a second end wall 322a, and a plurality of side walls 326a extending between the first end wall 318a and the second end wall 322a. The second portion 317 has a first end wall 318b, a second end wall 322b, and a plurality of side walls 326b extending between the first end wall 318b and the second end wall 322b. In this embodiment, a pressure port 330 extends from one of the plurality of side walls 326a, a vent port 338 and electrodes 342a, 342b extend from one of the plurality of side walls 326b, and a bladder port 334 extends from the second end wall 322b.

With reference to FIG. 8, an actuator assembly 346 is contained within the housing 314. The actuator assembly 346 includes a valve body or piston 350 with a slot 360. In this illustrated embodiment, a pin 359 is received in the slot 360 so that the piston 350 is operable to slide in a transverse direction relative to the pin 359. That is, the pin 359 and the slot 360 generally constrain movement of the piston 350 along a single axis. An actuator in the form of a metal plate spring 379 is supported within the housing 314 (e.g., in place of the first spring 70 and the second spring 78 described above with reference to FIGS. 1 and 2).

Figure 6:
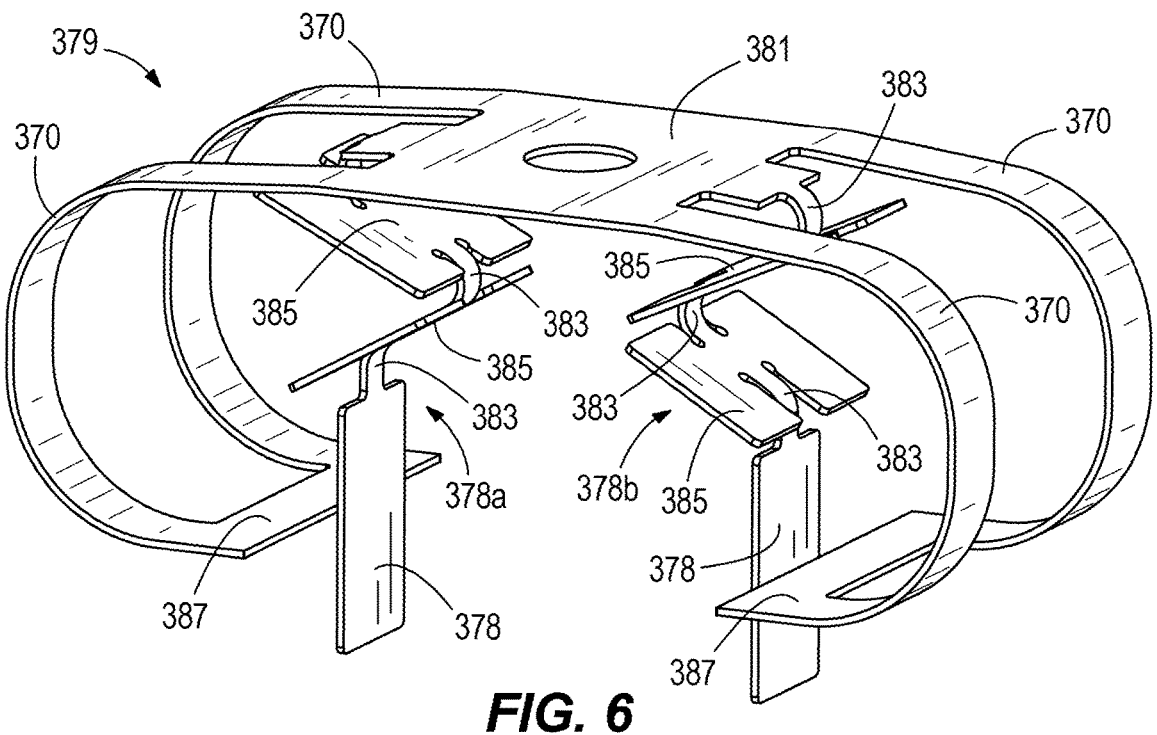
FIG. 6 is a perspective view of a shape memory alloy actuator in accordance with an embodiment of the disclosure, for use with a fluid management system.

Referring to FIG. 6, the plate spring 379 includes a pair of legs 378 and a plurality of curved biasing elements 370, which are arranged in two pairs in the illustrated embodiment, extending in opposite directions from a generally flat platform or stage 381. Each of the legs 378 includes an actuating portion 378a with a plurality of narrow bridges 383 interconnected by wider, heat dissipating portions 385. In the illustrated embodiment, the biasing elements 370 of each pair are joined at their distal ends by a generally flat foot portion 387. The foot portions 387 extend generally parallel with the stage 381 in the illustrated embodiment.

The illustrated plate spring 379 is manufactured by laser cutting or stamping a flat, monolithic piece of material, although other methods may be used. The plate spring 379 is made of a shape memory alloy material, and the actuating portions 378a of the legs 378 are processed to reach a desirable temperature-based response. The structure is then shape-set as illustrated in FIG. 6. In other embodiments, the plate spring 379 may be made from multiple components fastened or engaged together in any suitable manner. For example, in some embodiments, the biasing elements 370 may be formed separately and coupled to the stage 381 by welding, brazing, soldering, or the like.

Like the second spring 78 described above with reference to FIGS. 1 and 2, the actuating portions 378a have a temperature-dependent behavior. That is, the actuating portions 378a have one shape or dimension associated with a martensitic crystalline structure at low temperature and another shape or dimension associated with an austenitic crystalline structure at high temperature. The transformation is reversible, such that the shape and/or size of the actuating portions 378a can be selectively varied. The manufacturing process allows the sheet metal plate spring 379 to function in an operating temperature range, for example −40° C. to +80° C. (or other temperature ranges if required).

Referring to FIG. 8, the plate spring 379 is positioned within the housing 314 such that the legs 378 contact the electrodes 342a, 342b. The stage 381 is coupled to the piston 350. The electrodes 342a, 342b are electrically coupled to a power source such that the power source, the electrodes 342a, 342b, the legs 378, and the stage 381 form an electric circuit 382. Alternatively, the legs 378 may extend from the housing 314 to be directly electrically coupled the power source, a PCB, or the like.

With continued reference to FIG. 8, the housing 314 may include internal support features 388 that support the actuator assembly 346. For example, in the illustrated embodiment, the second portion 317 of the housing 314 includes a plurality of posts 397 extending inwardly toward the first housing portion 315. The posts 397 include slots 398 that receive the foot portions 387 of the plate spring 379. As such, the posts 397 may secure the plate spring 379 within the housing 314. In other embodiments, additional or alternative support feature(s) 388 may be provided to secure the plate spring 379 within the housing 314.

In some embodiments, to assemble the fluid management system 310, the actuator assembly 346 may be installed into the second housing portion 317. For example, in the illustrated embodiment, the biasing members 370 may be deformed inwardly until the foot portions 387 are disposed inwardly of the posts 397. Then, the actuator assembly 346 may be positioned against the second housing portion 317 and the biasing members 370 released. The foot portions 387 may then move outwardly and into the respective slots 398 in the posts 397, thereby securing the plate spring 379 of the actuator assembly 346 in its installed position.

With the actuator assembly 346 installed, the first housing portion 315 may be moved toward the second housing portion 317 to couple the housing portions 315, 317 together and enclose the actuator assembly 346 within the housing 314. As the first housing portion 315 is moved toward the second housing portion 317, the first housing portion 315 may engage against the piston 350 and move the piston 350 toward the second housing portion 317, deforming the plate spring 379 and applying a desired preload to the biasing elements 370. This deformation may also pre-strain the actuating portions 378a, 378b, which may advantageously provide for more consistent operation of the actuating portions 378a, 378b.

In operation, the piston 350 is movable between a first or inflating position and a second or deflating position (illustrated in FIG. 8) to selectively inflate or deflate a vessel coupled to the bladder port 334. To inflate the vessel, the pressurized air source supplies pressurized air to the pressurized air port 330, and the power source is energized. The power source drives current through the electric circuit 382 such that current flows from the power source through the legs 378. The narrow bridges 383 of the actuating portions 378a are heated when current flows through them. The shape memory alloy material contracts, forcing the stage 381 downward, which moves the piston 350 toward the vent port 338. The vent port seal element 368 engages and seals the vent port 338. Thus, the source of pressurized air pressurizes the interior of the housing 314 and inflates the vessel coupled to the bladder port 334.

In some embodiments, the pin 359 may be movable (e.g., manually, via an electric or pneumatic actuator, or via any other means) into a position in which the pin 359 engages the bottom end of the slot 360 in the piston 350. The pin 359 may thus hold the piston 350 in the inflating position. Embodiments incorporating a movable pin may allow the power source to be deenergized while the piston 350 is held in the inflating position. In other embodiments, the pin 359 may only guide the piston 350.

To deflate the vessel, the power source is deenergized to cease driving current through the electric circuit 382 such that current no longer flows from the power source through the actuating portions 378a of the legs 378. Without current flowing through the legs 378, the narrow bridges 383 cool and expand. The biasing elements 370 restore the sheet metal plate spring 379 to its original shape, which moves the piston 350 to the deflating position. In the deflating position, the pressure port seal element 366 engages and seals the pressure port 330, while the vent port seal element 368 moves away from the vent port 338. As such, pressurized air is prevented from entering the interior of the housing 314 through the pressure port 330, and the interior of the housing 314 fluidly communicates with the ambient environment through the vent port 338. This allows the vessel coupled to the bladder port 334 to deflate.

In alternative embodiments, the structure of the actuator assembly 346 and/or the actuating portions 378a of the plate spring 379 may be configured to expand when heated, rather than contract. In such embodiments, the positions of the pressure port 330 and the vent port 338 are reversed.

Figure 9:
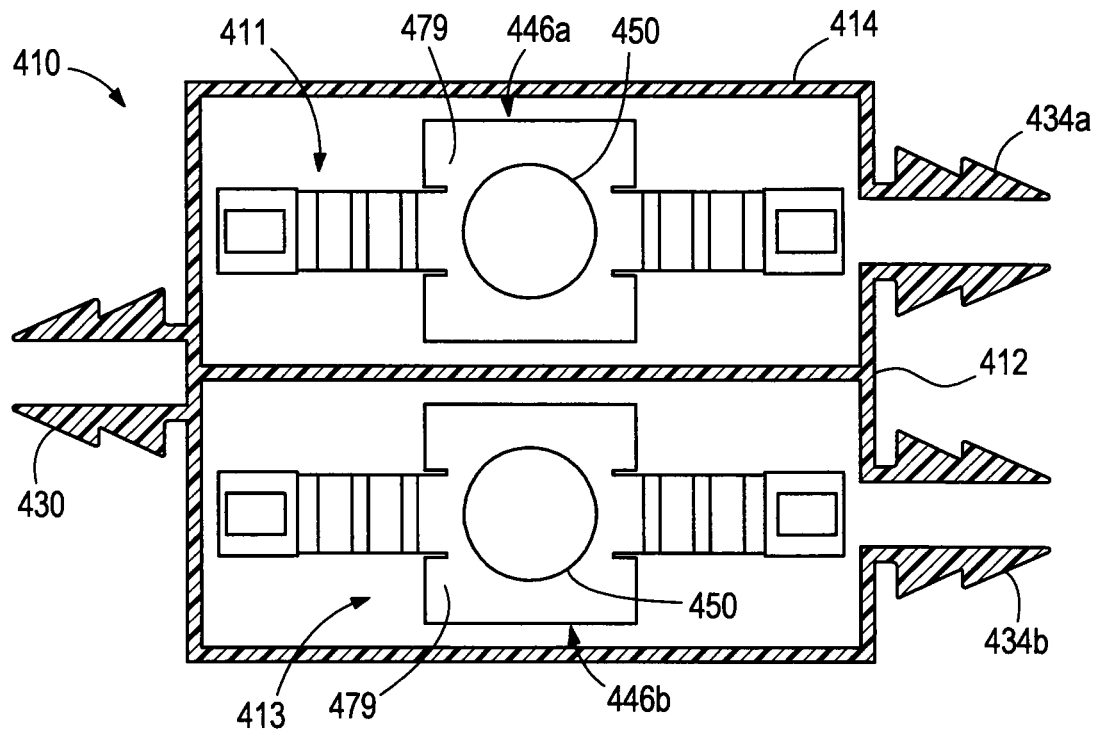
FIG. 9 is a cross-sectional view of a fluid management system in accordance with another embodiment of the disclosure.

FIG. 9 illustrates a fluid management system 410 according to another embodiment. The illustrated fluid management system 410 is similar to the fluid management system 310 described above with reference to FIGS. 7-8. Features and elements of the system 410 corresponding with features and elements of the system 310 are given corresponding reference numbers plus '100.' In addition, the following description focuses primarily on differences between the system 410 and the system 310. It should be understood that features and elements of the system 10 may be incorporated into the system 310, and vice versa.

Referring to FIG. 9, the system 410 includes a housing 414. The housing 414 has a divider 412 dividing the housing 414 into a first chamber 411 and a second chamber 413. In the illustrated embodiment, a pressure port 430 is fluidly coupled to both the first chamber 411 and the second chamber 413. The system 410 further includes vent ports (not shown) and bladder ports 434a, 434b associated with each of the chambers 411, 413.

The first chamber 411 and the second chamber 413 of the housing 414 each contain an actuator assembly 446a, 446b with a valve body or piston 450 coupled to a plate spring 479, like the plate spring 379 described above with reference to FIG. 6.

In operation, to inflate vessels coupled to the bladder ports 434a, 434b, the pressurized air source supplies pressurized air through the pressure port 430 while the piston bodies 450 are positioned to seal the vent ports. To deflate the vessels, the power source (not shown) is energized to actuate the plate springs 479a, 479b, which in turn opens the vent ports. The pressurized air source is shut off, and the vessels deflate.

Figure 10:
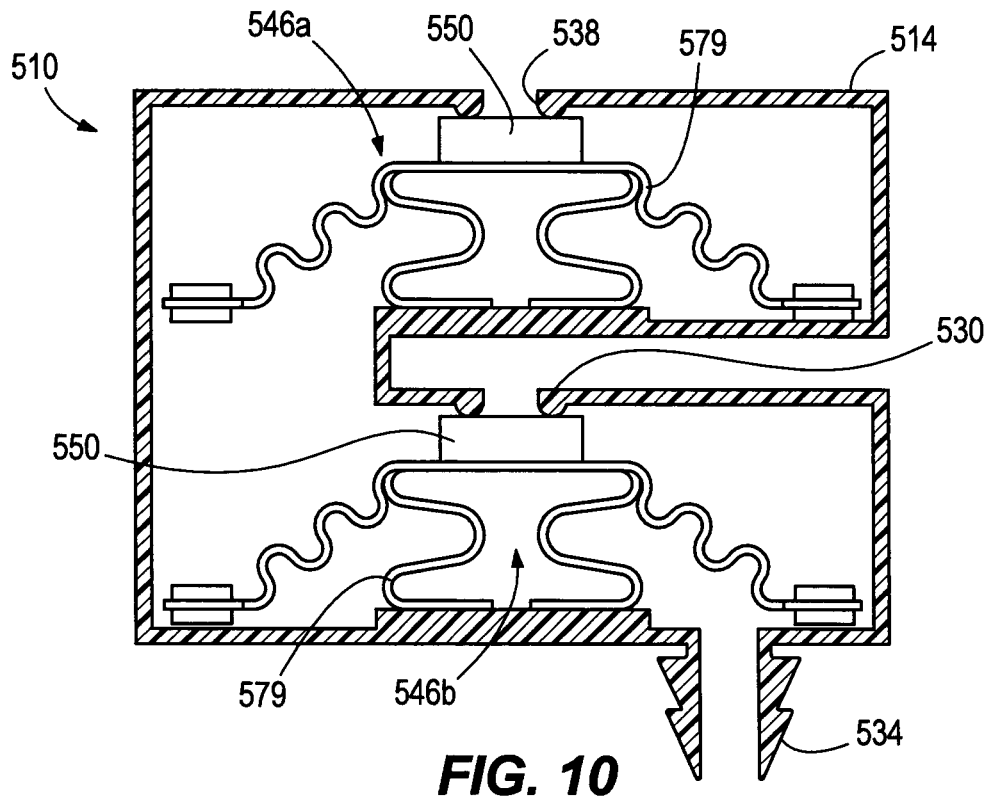
FIG. 10 is a cross-sectional view of a fluid management system in accordance with another embodiment of the disclosure.

FIG. 10 illustrates a fluid management system 510 according to another embodiment. The fluid management system 510 is similar to the fluid management system 310 of FIGS. 7-8B. Features and elements of the system 510 corresponding with features and elements of the fluid management system 310 are given corresponding reference numbers plus '200.' In addition, the following description focuses primarily on differences between the system 510 and the system 310. It should be understood that features and elements of the system 510 may be incorporated into the system 310, and vice versa.

Referring to FIG. 10, the system 510 includes a housing 514, a pressure port 530, a bladder port 534, and a vent port 538. The housing 514 contains two actuator assemblies 546a, 546b, each having a piston 550 coupled to a plate spring 579, like the plate spring 379 described above with reference to FIG. 6. The actuator assemblies 546a, 546b can be independently actuated to provide the system 510 with an inflating position in which the pressure port 530 is open and the vent port 538 is closed, a deflating position in which the pressure port 530 is closed and the vent port 538 is open, and a neutral position (illustrated in FIG. 10) in which the pressure port 530 and the vent port 538 are both closed, such that pressure may be held within the vessel coupled to the bladder port 534.

In operation, to inflate a vessel coupled to the bladder port 534, the pressurized air source supplies pressurized air through the pressure port 530. The power source energizes the second actuator assembly 546b, which causes the plate spring 579 of the second actuator assembly 546b to contract and thereby open the pressure port 530. To deflate the vessel, the power source energizes the first actuator assembly 546a, which causes the plate spring 579 of the first actuator assembly 546a to contract and thereby open the vent port 550.

Thus, the present disclosure provides various embodiments of fluid management systems that allow for a significant reduction in mass when compared to conventional fluid management systems (such as solenoid valve systems). The fluid management systems disclosed herein advantageously provide a reduced packaging footprint and an increased flexibility in design due to the ability to use one or more valve systems at the same time. Further, the use of an actuator including a shape memory alloy material may reduce the number of components compared to conventional fluid management systems and thereby greatly reduce time required to assemble the fluid management systems according to embodiments of the present disclosure. Finally, the fluid management systems described and illustrated herein may have additional advantages, including but not limited to improved electromagnetic compatibility (e.g., reduced electromagnetic emissions, particularly compared to typical solenoid valve systems), and quieter operation that conventional fluid management systems.

Although the disclosure has been described in detail with reference to certain preferred embodiments, variations and modifications exist within the scope and spirit of one or more independent aspects of the disclosure as described.

Various features of the disclosure are set forth in the following claims:

The invention claimed is:

1. A fluid management system comprising:
   a housing including a first port, a second port, and a third port, wherein the housing comprises a first housing portion coupled to a second housing portion;
   an actuator assembly including a shape memory alloy material and a valve body moveable within the housing between a first position and a second position, wherein the valve body is configured to seal the third port and permit fluid flow between the first port and the second port in the first position, and to seal the first port and permit fluid flow between the second port and the third port in the second position, and wherein the valve body includes a piston having first and second sealing elements disposed at opposite ends of the piston; and
   a biasing element coupled to the actuator assembly, the biasing element configured to bias the valve body toward one of the first position or the second position, and
   wherein the actuator assembly and biasing element are each attached to the second housing portion,
   wherein the housing is configured such that the first housing portion engages against the actuator assembly to apply a pre-load to the biasing element, and
   wherein the actuator assembly is configured to move the valve body to one of the first position or the second position against a biasing force of the biasing element in response to heating the shape memory alloy material of the actuator assembly.

2. The fluid management system of claim 1, further comprising a power source electrically coupled to the actuator assembly, wherein the power source is configured to selectively drive current through the actuator assembly to heat the actuator assembly.

3. The fluid management system of claim 2, wherein a portion of the actuator extends into a side of the second portion of the housing and is electrically coupled to the power source.

4. The fluid management system of claim 1, wherein the actuator assembly and the biasing element are integrally formed together from a single piece of monolithic material.

5. The fluid management system of claim 1, wherein coupling the first portion to the second portion secures the biasing element within the housing.

6. The fluid management system of claim 5, wherein the first portion includes a plurality of posts, and wherein the posts are engageable with the biasing element.

7. The fluid management system of claim 1, wherein the housing includes a plurality of internal supports configured to support the actuator assembly within the housing and the plurality of internal supports and the first, second, and third ports are molded with the housing.

8. The fluid management system of claim 1, further comprising first and second electrodes electrically coupled to the actuator assembly, wherein the first and second electrodes extend through at least one wall of the housing.

9. The fluid management system of claim 1, wherein the first port and the third port are coaxial and the piston is movable between the first position and the second position, and wherein the first sealing element is configured to seal the third port in the first position and the second sealing element is configured to seal the first port in the second position.

10. The fluid management system of claim 1, wherein an opening of the first port into an interior of the housing and an opening of the third port into the interior of the housing are each formed by an interior wall of the housing.

11. A fluid management system comprising:
    a housing including a first port, a second port, and a third port, wherein the first port and the third port are coaxial along a first axis and the second port has a second axis that is perpendicular to the first axis;
    a valve body moveable within the housing between a first position and a second position, the valve body configured to seal the third port and permit fluid flow between the first port and the second port in the first position, and to seal the first port and permit fluid flow between the second port and the third port in the second position;
    an actuator coupled to the valve body, the actuator including a shape memory alloy material; and
    a biasing element coupled to the valve body, the biasing element configured to bias the valve body toward one of the first position or the second position, and
    wherein the actuator is configured to move the valve body to one of the first position or the second position against a biasing force of the biasing element in response to heating the shape memory alloy material of the actuator,
    wherein the biasing element and the actuator are each attached to a same side of the housing, and
    wherein the biasing element biases the valve body in a direction away from the side of the housing to which the actuator and the biasing element are each attached.

12. The fluid management system of claim 11, wherein the third port is downstream from the second port.

13. The fluid management system of claim 11, wherein the biasing element biases the actuator in a direction away from the side of the housing to which the actuator and the biasing element are each attached.

14. A fluid management system comprising:
 a housing including a first port, a second port, and a third port;
 a valve body moveable within the housing between a first position and a second position, the valve body configured to seal the third port and permit fluid flow between the first port and the second port in the first position, and to seal the first port and permit fluid flow between the second port and the third port in the second position;
 an actuator coupled to the valve body, the actuator including a shape memory alloy material; and
 a biasing element coupled to the valve body, the biasing element configured to bias the valve body toward one of the first position or the second position, and
 wherein the actuator is configured to move the valve body to one of the first position or the second position against a biasing force of the biasing element in response to heating the actuator,
 wherein the housing includes a first portion and a second portion, the first portion is configured to be coupled to the second portion during assembly of the housing, and coupling the first portion to the second portion applies a pre-load to the biasing element,
 wherein coupling the first portion to the second portion secures the biasing element within the housing, and
 wherein the first portion includes a plurality of posts, and wherein the posts are engageable with the biasing element.

15. The fluid management system of claim 14, wherein the biasing element and the actuator are each coupled to the second portion, and wherein the housing is configured such that coupling the first portion to the second portion causes the first portion to apply a pre-load to the biasing element.

16. The fluid management system of claim 14, wherein the biasing element biases the actuator in a direction away from the second portion of the housing and toward the first portion of the housing.

* * * * *